United States Patent
Jung et al.

(10) Patent No.: US 8,265,012 B2
(45) Date of Patent: Sep. 11, 2012

(54) ADAPTIVE SUBCHANNEL AND BIT ALLOCATION METHOD USING PARTIAL CHANNEL INFORMATION FEEDBACK IN AN ORTHOGONAL FREQUENCY DIVISION MULTIPLE ACCESS COMMUNICATION SYSTEM

(75) Inventors: Young-Ho Jung, Seoul (KR); Jae-Hak Chung, Seoul (KR); Chan-Soo Hwang, Yongin-si (KR); Seung-Hoon Nam, Seoul (KR)

(73) Assignee: Samsung Electronics Co., Ltd (KR)

( * ) Notice: Subject to any disclaimer, the term of this patent is extended or adjusted under 35 U.S.C. 154(b) by 1042 days.

(21) Appl. No.: 11/321,546

(22) Filed: Dec. 29, 2005

(65) Prior Publication Data

US 2006/0146856 A1    Jul. 6, 2006

(30) Foreign Application Priority Data

Dec. 30, 2004   (KR) ..................... 10-2004-0117454

(51) Int. Cl.
    *H04W 4/00*     (2009.01)
(52) U.S. Cl. ........................ 370/329; 370/431
(58) Field of Classification Search .............. None
    See application file for complete search history.

(56) References Cited

U.S. PATENT DOCUMENTS

| | | | |
|---|---|---|---|
| 6,836,484 B2 | 12/2004 | Suzuki | |
| 6,882,619 B1 * | 4/2005 | Gerakoulis | 370/209 |
| 7,372,912 B2 | 5/2008 | Seo et al. | |
| 7,539,253 B2 * | 5/2009 | Li et al. | 375/260 |
| 2007/0230324 A1 * | 10/2007 | Li et al. | 370/204 |
| 2007/0263735 A1 * | 11/2007 | Tong et al. | 375/260 |
| 2008/0039107 A1 * | 2/2008 | Ma et al. | 455/450 |
| 2008/0069031 A1 * | 3/2008 | Zhang et al. | 370/328 |
| 2008/0108310 A1 * | 5/2008 | Tong et al. | 455/69 |

FOREIGN PATENT DOCUMENTS

| | | |
|---|---|---|
| JP | 2001-238269 | 8/2001 |
| KR | 1020040056976 | 7/2004 |
| KR | 1020040056987 | 7/2004 |
| KR | 120040098752 | 11/2004 |

* cited by examiner

*Primary Examiner* — Yemane Mesfin
*Assistant Examiner* — Rhonda Murphy
(74) *Attorney, Agent, or Firm* — The Farrell Law Firm, P.C.

(57) ABSTRACT

An adaptive subchannel and bit allocation method in a wireless communication system. A mobile station analyzes channel quality information of a subchannel at a predetermined period and determines a feedback band index with a maximum decision criterion. The mobile station feeds back the determined feedback band index with the maximum decision criterion to a base station. The base station generates band allocation information using the feedback information from the mobile station, and transmits the band allocation information to the mobile station. The mobile station transmits AMC information using the band allocation information received from the base station. The base station estimates a channel using the AMC information transmitted from the mobile station and allocates bits to the allocated band according to the channel estimation result.

30 Claims, 8 Drawing Sheets

ADAPTIVE SUBCHANNEL AND BIT ALLOCATION METHOD USING PARTIAL CHANNEL INFORMATION FEEDBACK IN AN ORTHOGONAL FREQUENCY DIVISION MULTIPLE ACCESS COMMUNICATION SYSTEM

PRIORITY

This application claims priority under 35 U.S.C. §119 to an application entitled "Adaptive Subchannel and Bit Allocation Method Using Partial Channel Information Feedback in an Orthogonal Frequency Division Multiple Access Communication System" filed in the Korean Intellectual Property Office on Dec. 30, 2004 and assigned Serial No. 2004-117454, the contents of which are incorporated herein by reference.

BACKGROUND OF THE INVENTION

1. Field of the Invention

The present invention relates generally to the bands Adaptive Modulation and Coding (AMC) method in an Orthogonal Frequency Division Multiple Access (OFDMA) communication system, and in particular, to an adaptive subchannel and bit allocation method using feedback information in an OFDMA communication system.

2. Description of the Related Art

Research into the 4$^{th}$ generation (4G) mobile communication system, which is the next generation communication system, is being conducted to provide users with services having various Qualities-of-Service (QoSs) at a data rate of about 100 Mbps. Compared with the 4G communication system, the current 3$^{rd}$ generation (3G) mobile communication system supports a data rate of about 384 Kbps in an outdoor channel environment providing relatively poor channel conditions and supports a data rate of 2 Mbps at most even in an indoor channel environment providing relatively good channel conditions.

A wireless Local Area Network (LAN) system and a wireless Metropolitan Area Network (MAN) system generally support a data rate of 20 to 50 Mbps. Currently, a study of the 4G mobile communication system is being actively performed to develop a new communication system capable of supporting mobility and QoS in the wireless LAN system and the wireless MAN system, both of which guarantee a relatively high data rate, thereby to support a high-speed service that the 4G mobile communication system aims to provide. An Orthogonal Frequency Division Multiplexing (OFDM) scheme has emerged as a promising scheme useful for high-speed data transmission on wired/wireless channels in the 4G communication system. The OFDM scheme, a typical scheme for transmitting data using multiple carriers, is a type of Multi-Carrier Modulation (MCM) scheme for parallel-converting a serial input symbol stream and modulating each of the symbols with the multiple orthogonal subcarriers, or subcarrier channels, before transmission.

A multiple access scheme based on the OFDM scheme is known as the OFDMA scheme. The OFDMA scheme allows multiple users (i.e. mobile stations) to share the subcarriers of one OFDM symbol. Communication systems using the OFDMA scheme include Institute of Electrical and Electronics Engineers (IEEE) 802.16a, 802.16d and 802.16e communication systems. The IEEE 802.16d communication system is a communication system employing the OFDMA scheme to support a broadband transmission network to physical channels for the wireless MAN system. The IEEE 802.16d communication system is a typical example of a Broadband Wireless Access (BWA) communication system using a TDD (Time Division Duplex)-OFDMA scheme. The IEEE 802.16d communication system, as it applies the OFDMA scheme to the wireless MAN system, can support high-speed data transmission by transmitting physical channel signals using a plurality of subcarriers.

Figure 1:
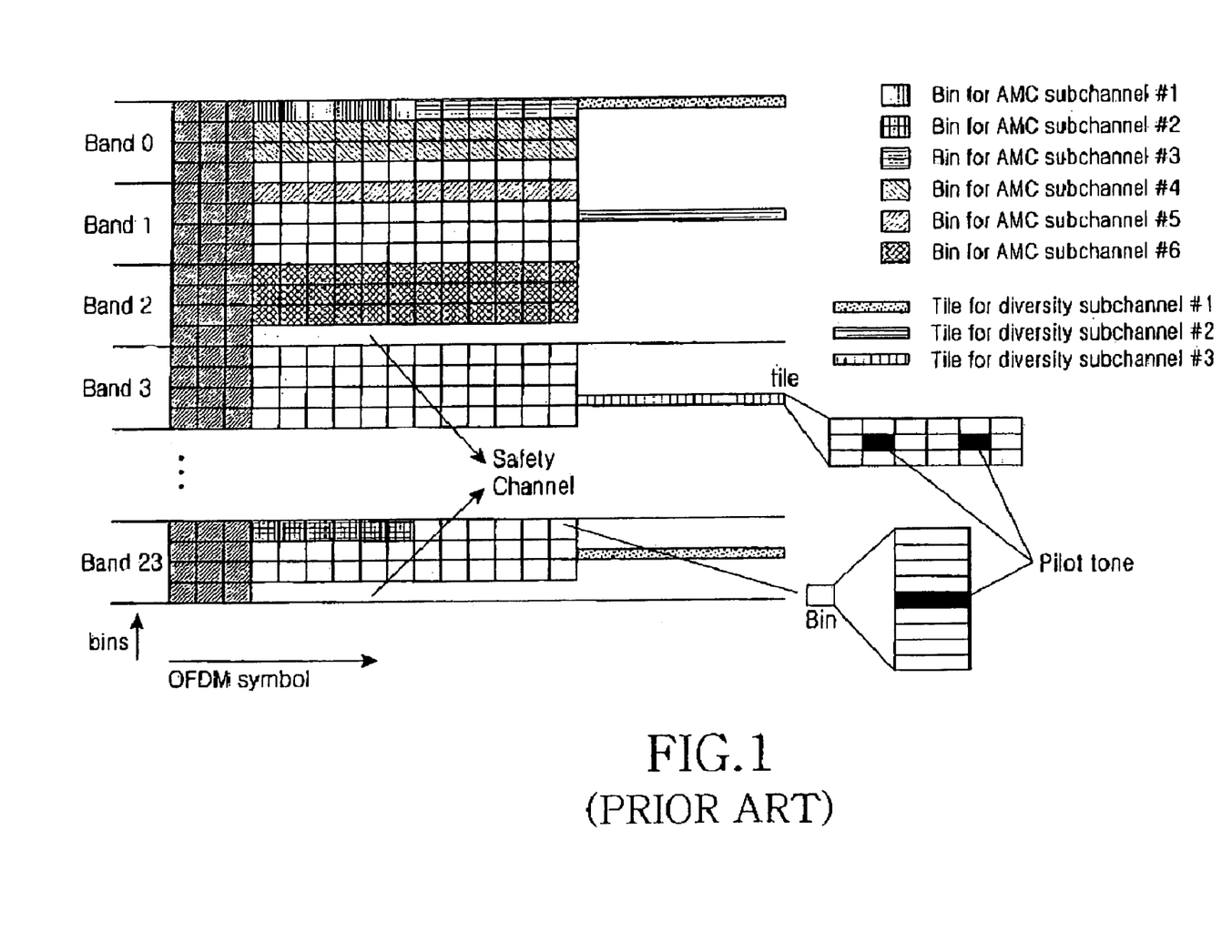
FIG. 1 is a diagram illustrating a frame structure for a general OFDMA communication system.

With reference to FIG. 1, a description will now be made of a frame structure for the OFDMA communication system.

Referring to FIG. 1, a full subcarrier band is divided into a plurality of bands, each band including a plurality of bins or tiles. Each bin or tile has a plurality of subcarriers. A bin is the set of 9 consecutive subcarriers within an OFDM symbol, having 1 pilot tone and 8 data tones, and a tile is composed of the set of 3 consecutive subcarriers in 6 consecutive OFDM symbols, having 2 pilot tones and 16 data tones.

In a frame, the first three OFDM symbols are used for a ranging channel, a Hybrid Automatic Repeat reQuest (HARQ) channel, and a Channel Quality Information (CQI) channel, while the other OFDM symbols are allocated to the bands AMC channel, a diversity channel, and a safety channel.

The leading band AMC channel is allocated in units of band comprised of 6 bins, and the following diversity channel is allocated in units of subchannel comprised of three tiles spread over the full subcarrier band. The band AMC channel, occupying more OFDM symbols than the diversity channel, can be used to transmit/receive a large amount of data at a high rate by applying a modulation scheme with a high coding efficiency when reception quality is good.

A safety channel occupies one bin across all OFDM symbols. The safety channel is allocated all symbols of one bin. A mobile station is allocated a safety channel with a frequency band allocable in a base station in a safety channel unused in a neighboring cell, i.e., a frequency band that remains unallocated.

To allocate an appropriate channel to a mobile station according to its state, a base station must have knowledge of the state of the mobile station. Therefore, if the data quality of the mobile station is decreasing, the base station transmits a CQI request message to the mobile station, for channel reallocation.

In the above-described OFDMA communication system, CQI messages for all bands are periodically fed back to the base station. This feedback can be expressed as "4 bits/band× 32 bands×200 Hz×32 users=819.2 Kbps" in the case of FIG. 1.

The feedback information is very large in size in the conventional technology, decreasing transmission efficiency. Therefore, there is a need for developing a CQI feedback and AMC scheme that exhibits the same performance as that achieved in the case where CQIs of all bands are used with a less amount of feedback information.

SUMMARY OF THE INVENTION

It is, therefore, an object of the present invention to provide a channel information feedback method for increasing channel information transmission efficiency in an Orthogonal Frequency Division Multiple Access (OFDMA) communication system.

It is another object of the present invention to provide an adaptive subchannel and bit allocation method for minimizing feedback information and improving a data rate in an OFDMA communication system.

It is further another object of the present invention to provide a feedback information decision method for achieving a data rate similar to that in the case where information on all channels is used with a less amount of feedback information in an OFDMA communication system.

According to one aspect of the present invention, there is provided an adaptive subchannel and bit allocation method in a wireless communication system that divides a full frequency band into a plurality of subcarrier bands and has subchannels, each of which is a set of a predetermined number of consecutive subcarriers. The method includes analyzing, by a mobile station, channel quality information of a subchannel at a predetermined period and determining a feedback band index with a maximum decision criterion, the mobile station being located in a boundary between base stations constituting the wireless communication system, wherein each of the subchannels is divided into a diversity subchannel for acquisition of frequency diversity gain and an adaptive modulation and coding (AMC) subchannel for high-speed, high-capacity data transmission; feeding back, by the mobile station, the determined feedback band index with the maximum decision criterion to a base station; generating, by the base station, band allocation information using the feedback information from the mobile station, and transmitting the band allocation information to the mobile station; transmitting, by the mobile station, AMC information using the band allocation information received from the base station; and estimating, by the base station, a channel using the AMC information transmitted from the mobile station and allocating bits to the allocated band using the channel estimation result.

According to another aspect of the present invention, there is provided an adaptive subchannel and bit allocation method in a wireless communication system that divides a full frequency band into a plurality of subcarrier bands and has subchannels, each of which is a set of a predetermined number of consecutive subcarriers. The method includes determining, by a mobile station, a feedback band index having the best channel condition in a current band using feedback band allocation information of a previous channel, and feeding back the determined feedback band index to a base station; allocating, by the base station, bits to a previously allocated band using the feedback information, and transmitting band allocation information based on the feedback information to the mobile station; transmitting, by the mobile station, a pilot for adaptive modulation and coding (AMC) to the base station using the bands allocated in the base station; and estimating, by the base station, a channel using the received pilot, and allocating bits for the allocated band according to the channel estimation result.

According to further another aspect of the present invention, there is provided an adaptive subchannel and bit allocation method in a wireless communication system that divides a full frequency band into a plurality of subcarrier bands and has subchannels, each of which is a set of a predetermined number of consecutive subcarriers. The method includes analyzing, by a mobile station, channel quality information of a subchannel at a predetermined period, determining a feedback band index with a maximum decision criterion, and transmitting a pilot for uplink adaptive modulation and coding (AMC) to a base station, the mobile station being located in a boundary between base stations constituting the wireless communication system, wherein each of the subchannels is divided into a diversity subchannel for acquisition of frequency diversity gain and an AMC subchannel for high-speed, high-capacity data transmission; and allocating, by the base station, a downlink band and bits using the feedback information from the mobile station.

According to further another aspect of the present invention, there is provided an adaptive subchannel and bit allocation method in a wireless communication system that divides a full frequency band into a plurality of subcarrier bands and has subchannels, each of which is a set of a predetermined number of consecutive subcarriers. The method includes determining, by a mobile station, a feedback band index having the best channel condition in a current band using feedback band allocation information of a previous channel, and feeding back the determined feedback band index to a base station; allocating, by the base station, bits to a previously allocated downlink band using the feedback information; and determining, by the mobile station, the indexes of the bands with a next maximum decision criterion except for the index of the band with the maximum decision criterion and the feedback band index with the decision criterion, and feeding back the determined index.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for conciseness.

The present invention relates to an Orthogonal Frequency Division Multiple Access (OFDMA) communication system using a Time Division Duplex (TDD) scheme (hereinafter referred to as a "TDD-OFDMA communication system"), or an OFDMA communication system using a Frequency Division Duplex (FDD) scheme (hereinafter referred to as an "FDD-OFDMA communication system"). In particular, the present invention proposes an adaptive subchannel and bit allocation method for the TDD-OFDMA communication system or the FDD-OFDMA communication system, and a channel information feedback method therefor.

Before a description of the present invention is given, it should be noted that in the conventional OFDMA communication system like IEEE 802.16e, Channel Quality Information (CQI) of all bands is periodically feeded back in the form of a message (full CQI feedback) and CQIs of particular bands are updated using the CQI feedback channel (CQI update).

However, as described above, during full CQI feedback, the amount of the feedback information is very large, which reduces transmission efficiency of the system. Therefore, the present invention proposes a CQI feedback and AMC method capable of offering the same performance as that achieved in the case where CQIs of all bands are used with a less amount of feedback information.

For this purpose, the following methods are presented:
a method of selecting feedback subchannels from among all of the subchannels, and a CQI feedback method;

a subchannel and bit allocation method using partial channel information; and a method of adaptively allocating subchannels and bits according to a duplex scheme.

With reference to FIGS. 2 to 6, preferred embodiments of the present invention will now be described herein below.

Figure 2:
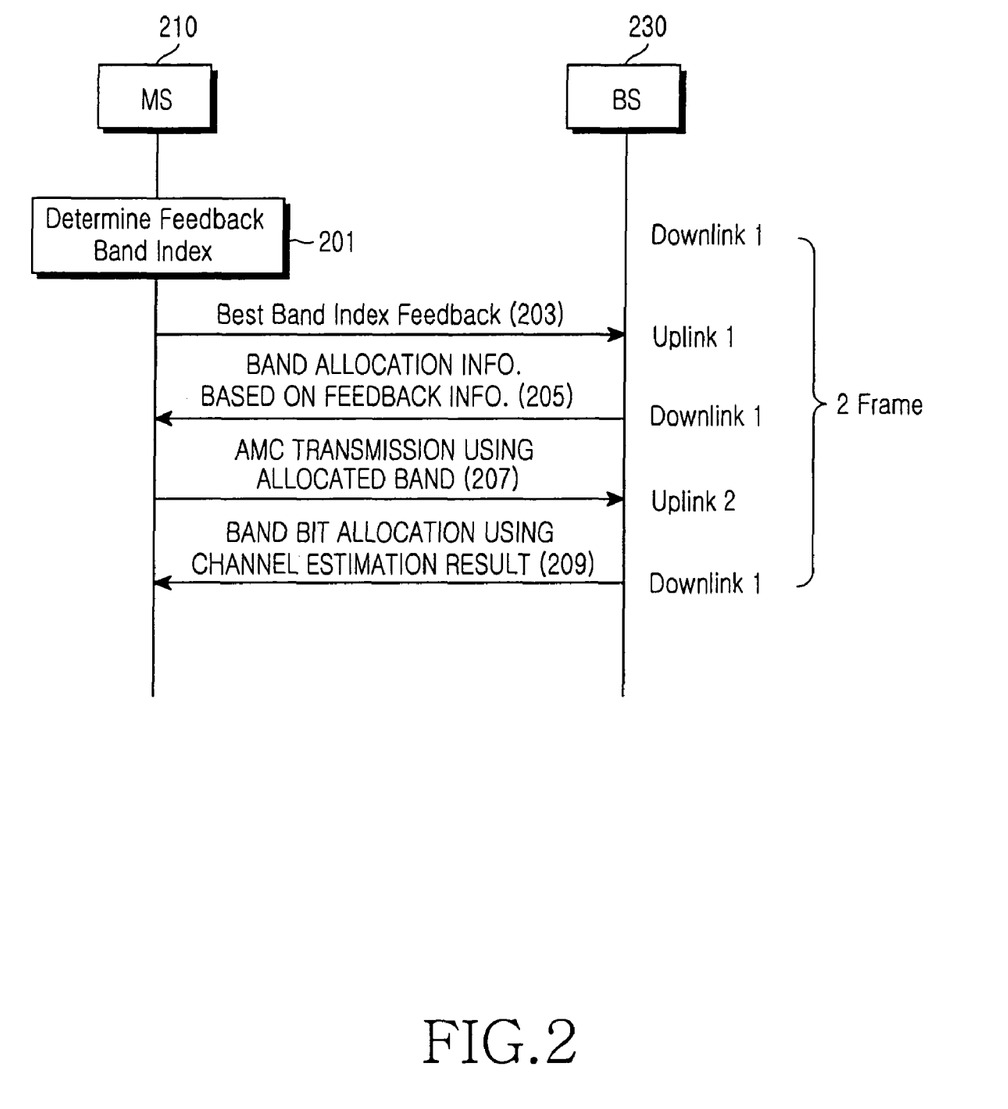
FIG. 2 is a signaling diagram for a description of an Adaptive Modulation and Coding (AMC) process using partial channel quality information feedback according to an embodiment of the present invention.

FIG. 2 is a signaling diagram for a description of an Adaptive Modulation and Coding (AMC) process using partial channel quality information feedback according to an embodiment of the present invention.

Before a description of FIG. 2 is given, it should be noted that the AMC process of FIG. 2 is performed in a TDD-OFDMA communication system environment in which an uplink channel is symmetrical with a downlink channel. In a wireless communication system in which a full frequency band is divided into a plurality of subcarrier bands and subchannels are provided, each of which is the set of a predetermined number of consecutive subcarriers, the subchannels are classified into diversity subchannels for acquisition of frequency diversity gain and AMC subchannels for high-speed, high-capacity data transmission.

Referring to FIG. 2, a particular mobile station (MS) 210 located in a boundary between base stations (BSs) constituting the communication system monitors the CQIs of subchannels at predetermined periods, and determines the feedback band indexes in step 201. The mobile station 210 feeds back the indexes of the band having a maximum decision criterion, i.e., having the best channel condition to a base station 230 in step 203. Then the base station 230 generates band allocation information using the information fed back from the mobile station 210, and transmits the band allocation information to the mobile station 210 in step 205.

The mobile station 210 transmits the uplink AMC data and pilots using the allocated band allocation according to the information received from the base station 230 in step 207. The base station 230 then estimates channels and allocates bits to the allocated band using the channel estimation result in step 209.

More specifically, the mobile station 210 transmits a pilot for uplink AMC subchannel to the base station 230 using the bands allocated in a previous downlink transmission (or frame). In this case, the mobile station 210 feeds back the indexes of the predetermined number of bands having the maximum decision criterion, i.e., having the best channel condition. Then the base station 230 estimates channels and allocates bits to the bands allocated in the previous downlink transmission (or frame) using the channel estimation result. Thereafter, the base station 230 transmits band allocation information to the mobile station 210 using the feedback information for the uplink. The mobile station 210 determines the feedback band indexes in the current downlink and the band indexes are fed back through the CQI feedback channel.

The mobile station 210 transmits a pilot to the base station 230 using the bands allocated in the current downlink. In this case, the mobile station 210 feeds back the indexes of the best bands determined in the current downlink. The base station 230 then estimates channels and allocates bits to the band allocated in the previous downlink frame using the uplink channel estimation result. Thereafter, the base station 230 transmits changed band allocation information to the mobile station 210 determined by the feedback best band indexes information from the uplink. The mobile station 210 determines the feedback band indexes in the next downlink using the downlink pilots from the base station 230.

In summary, the mobile station 210 determines the feedback band indexes having the best channel condition in the current band using the current downlink estimated channel information and feeds back the index of the best band to the base station 230, In addition mobile station 210 transmits uplink data using the AMC subchannel assigned at the previous downlink transmission. Then the base station 230 allocates bits to a previously allocated band based on the estimated uplink channel using the uplink pilots at the assigned band, and transmits updated band allocation information based on the feedback information (best band index) to the mobile station 210. The mobile station 210 transmits data and pilots to the base station 230 using the bands allocated in the base station 230. The base station 230 estimates channels using the received pilot and allocates bits for the allocated band using the channel estimation result.

A brief description will now be made of a CQI feedback and an AMC process in a TDD environment according to the foregoing embodiment of the present invention.

1) Feedback COI

Only the indexes of the pre-determined number of bands with the maximum decision criterion are fed back.

The downlink channel parameters are estimated using the uplink AMC band transmission. A 2-frame-delayed channel is used for downlink bit allocation.

2) AMC Process

Feedback delay—2 frames: referring to FIG. 2, there is a feedback delay of 2 frames from a downlink #1 until a downlink #3.

For example, indexes of bands with the maximum decision criterion can be expressed as follows.

First rank—band 5/second rank—band 3/third rank—band 10/. . . .

That is, in the TDD environment, CQIs are fed back taking into consideration only the ranking for the bands with the best channel conditions.

Next, a description will be made of a method for determining the feedback band.

For determining of the feedback band, only the CQIs for $N_{feed}$ bands with a higher decision criterion among all of the bands are fed back. Herein, the decision criterion refers to a value obtained by taking into consideration a signal-to-noise ratio (SNR), a capacity, and the number of transmittable bits. Basically, determining the $N_{feed}$ value is achieved through a feedback process on CQIs for $N_{feed}$ bands determined in a broadcast channel. However, if needed, the $N_{feed}$ value can be adjusted per user, or per mobile station, according to a dedicated control message.

Figure 3:
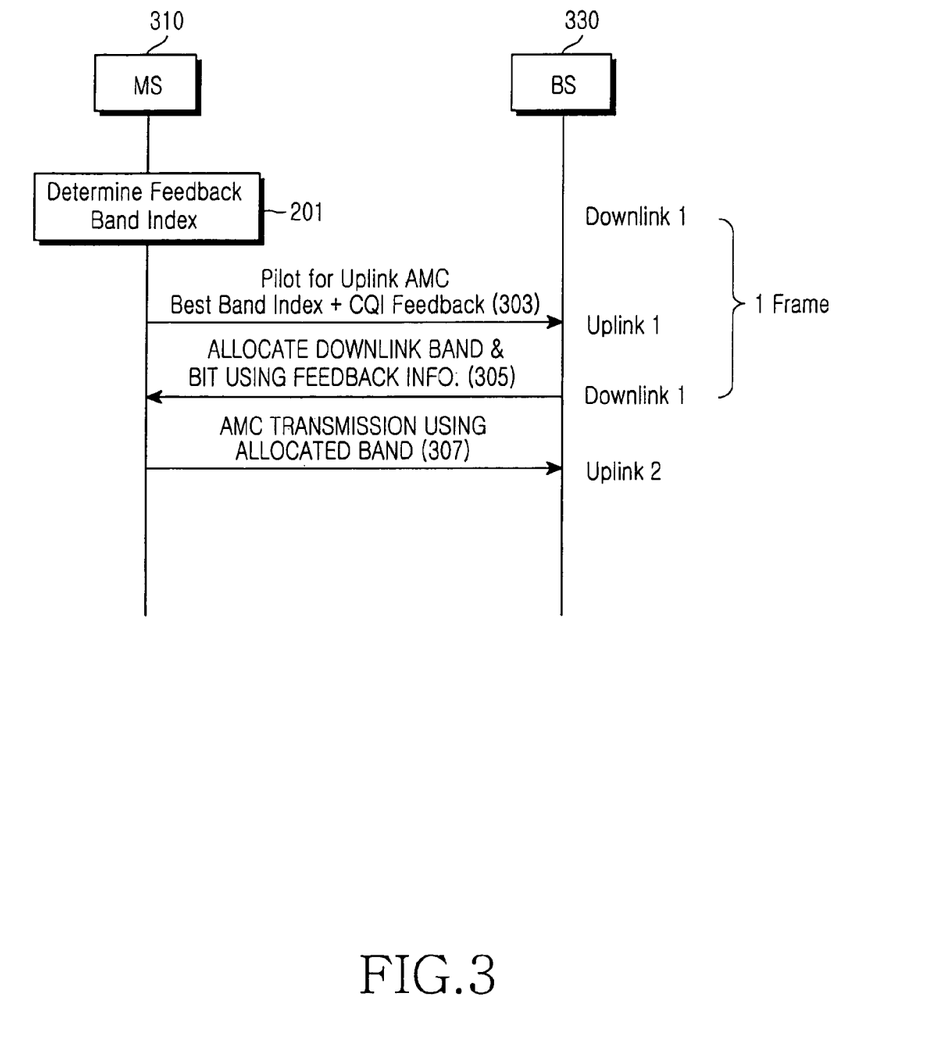
FIG. 3 is a signaling diagram for a description of an AMC process using partial channel quality information feedback according to another embodiment of the present invention.

FIG. 3 is a signaling diagram for a description of an AMC process using partial channel quality information feedback according to another embodiment of the present invention. The AMC process of FIG. 3 is performed in an FDD- or TDD-OFDMA communication system environment in which an uplink channel is asymmetrical with a downlink channel.

Referring to FIG. 3, a mobile station 310 determines the feedback band indexes in step 301, and transmits selected band indexes and channel quality information (for example signal to noise ratio) to a base station 330 in step 303. In this case, the base station 330 transmits the indexes of the bands having the maximum decision criterion, i.e., having the best channel condition, and channel quality to the base station 330. Then the base station 330 allocates a downlink band and bits using feedback information from the mobile station 310 and transmits the allocation information to the mobile station 310 in step 305. The mobile station 310 transmits uplink AMC data to the base station 330 using the band allocation information received from the base station 330 in step 307.

More specifically, the mobile station 310 transmits a pilot for uplink AMC to the base station 330 using the bands allocated in a previous downlink. In this case, the mobile station 310 feeds back at the indexes of the bands having the maximum decision criterion, i.e., having the best channel condition, and the CQI with a decision criterion of the selected bands. Then the base station 330 allocates band and bits of the current downlink using feedback information from the mobile station 310 in an uplink. Thereafter, the base station 330 allocates an uplink band and bits using the pilot for uplink AMC and transmits the allocation information to the mobile station 310. The mobile station 310 determines a feedback band index with the maximum decision criterion in the current downlink using the allocation information received from the base station 330.

In this case, the mobile station 310 feeds back the indexes of the bands with a maximum decision criterion and a decision criterion value. The base station 330 then allocates band and bits of the next downlink using feedback information from the mobile station 310 in the next uplink.

In summary, if the mobile station 310 feeds back the indexes of the bands with a maximum decision criterion and a decision criterion value to the base station 330, the base station 330 allocates the downlink bands and bits. Then the mobile station 310 determines the indexes of bands with the next maximum decision criterion except for the indexes of the band with the maximum decision criterion and the feedback band index with the decision criterion value. The mobile station 310 feeds back the indexes of the band with the maximum decision criterion and the decision criterion values to the base station 330, and then the base station 330 allocates a downlink band and bits using the feedback information received from the mobile station 310. Thereafter, the mobile station 310 transmits a pilot using the band allocated in the base station 330.

A brief description will now be made of a CQI feedback and AMC process in a TDD/FDD environment according to the foregoing embodiment of the present invention.

1) Feedback COI

The indexes of pre-determined number of bands with the maximum decision criterion and the decision criterion values are fed back.

Feedback for full CQI is needed for an uplink AMC channel, and one or more pilots are transmitted per band.

2) AMC Process

Feedback delay—1 frame: referring to FIG. 3, there is a feedback delay of 1 frame from a downlink #1 until a downlink #2.

If a non-feedback band is allocated, transmission is performed at a minimum rate.

For example, indexes of bands with the maximum decision criterion and decision criterion values can be expressed as follows:

First rank—band 5, 15 dB/second rank—band 3, 12 dB/third rank—band 10, 11 dB/....

That is, in the TDD/FDD environment, CQIs are fed back taking into consideration the ranking for the bands with the best channel conditions and MCS (Modulation and Coding Selection) levels.

Next, a description will be made of the bands allocation method using the partial CQI feedback according to the present invention.

A method for determining a cost function will first be described herein below.

1) Only the Indexes of the Bands with Maximum Decision Criterion is Fed Back

In this case, for the feedback band, an order becomes a cost and costs of the remaining bands use sufficiently large numbers as shown in Equation (1).

$$C = \begin{bmatrix} 1 & 8 & 8 & 2 & 8 & 8 & 3 & 8 \\ 8 & 8 & 2 & 8 & 8 & 1 & 8 & 3 \\ 8 & 2 & 8 & 1 & 8 & 3 & 8 & 8 \\ 2 & 8 & 3 & 8 & 1 & 8 & 8 & 8 \\ 8 & 1 & 8 & 2 & 8 & 8 & 3 & 8 \\ 8 & 8 & 8 & 8 & 3 & 2 & 1 & 8 \\ 2 & 3 & 8 & 8 & 8 & 8 & 8 & 1 \\ 8 & 1 & 8 & 3 & 2 & 8 & 8 & 8 \end{bmatrix} \quad (1)$$

In Equation (1), rows represent users, or mobile stations, and columns represent bands. In the case of a first row of Equation (1), a corresponding mobile station feeds back only the index of the bands with the maximum decision criterion in each of columns, or bands. For example, in Equation (1), the band having values of 1, 2 and 3 are fed back. The remaining bands except for the determined bands are mapped to, for example, the maximum value of 8. Herein, allocated bands are determined using a linear programming (LP) or Vogel's method that is generally applied based on the cost minimize value.

2) Index of Band with Maximum Decision Criterion and Decision Criterion Value are Fed Back In this case, for the feedback band, a decision criterion becomes a cost and costs of the remaining bands use sufficiently small numbers as shown in Equation (2).

$$C = \begin{bmatrix} 2 & 0 & 0 & 4 & 0 & 0 & 6 & 0 \\ 0 & 0 & 2 & 0 & 0 & 4 & 0 & 6 \\ 0 & 4 & 0 & 6 & 0 & 2 & 0 & 0 \\ 2 & 0 & 3 & 0 & 1 & 0 & 0 & 0 \\ 0 & 6 & 0 & 4 & 0 & 0 & 2 & 0 \\ 0 & 0 & 0 & 0 & 2 & 4 & 6 & 0 \\ 4 & 2 & 0 & 0 & 0 & 0 & 0 & 6 \\ 0 & 6 & 0 & 2 & 4 & 0 & 0 & 0 \end{bmatrix} \quad (2)$$

In Equation (2), rows represent users, or mobile stations, and columns represent bands. In the case of a first row of Equation (2), a corresponding mobile station feeds back the indexes of the bands with the maximum decision criterion in each of columns, or bands, and the decision criterion value such as an SNR and the number of transmittable bits. For example, in Equation (2), the indexes of the band having values of 2, 4 and 6, and the decision criterion value are fed back. The remaining bands except for the determined bands are mapped to, for example, the minimum value of 0. Herein, allocated bands are determined using the LP or Vogel's method that is generally applied based on the cost maximize value.

Figure 4:
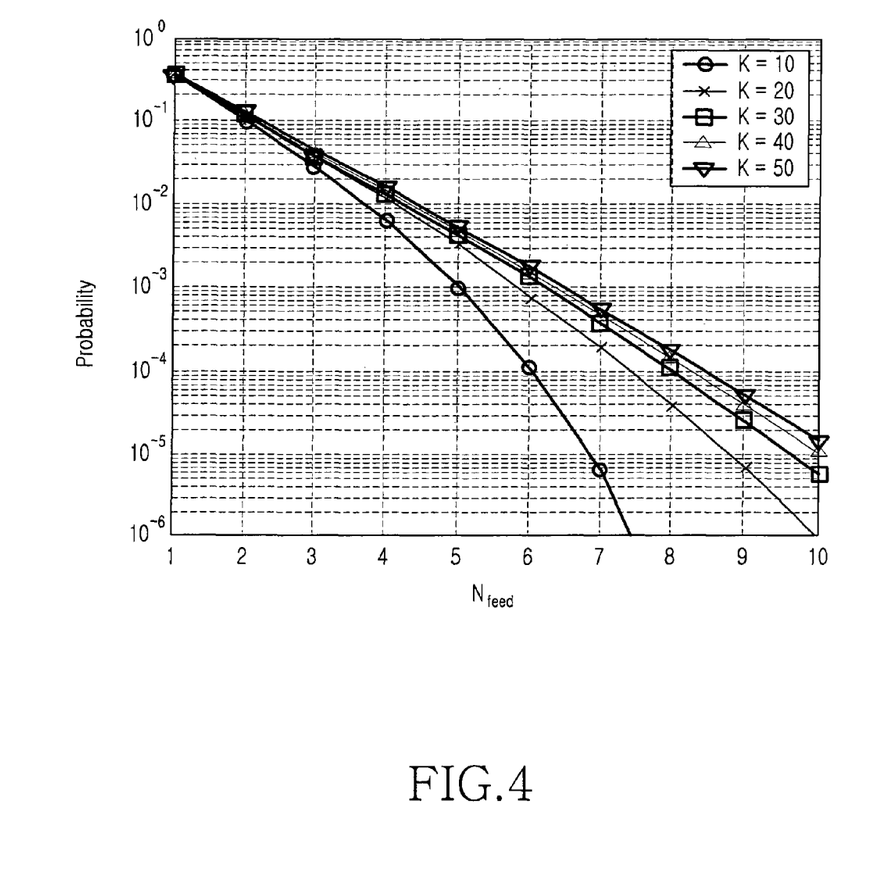
FIG. 4 is a graph illustrating the probability that non-feedback bands will be allocated in the embodiment of the present invention.

FIG. 4 is a graph illustrating the probability that non-feedback bands will be allocated in the embodiment of the present invention. It is assumed in FIG. 4 that m block CQIs among $N_{block}$ blocks are fed back and the $N_{block}$ equals K ($N_{block}$=K). It is also assumed that the blocks are probably equal to each other in their allocation probabilities. It can be understood from FIG. 4 that, for the case where the number $N_{feed}$ of feedback bands is 4, all of the bands are probably equal to each other within 1% in terms of their allocation probabilities.

The allocation probabilities of the non-feedback bands can be expressed as Equation (3):

$$P_{unsel} = \left(1 - \frac{N_{block}-1 C_{m-1}}{N_{block} C_m}\right)^K = (1 - m/N_{block})^K \quad (3)$$

where $P_{unsel}$ denotes allocation probability of a non-feedback band, $N_{block}$ and K denote the total number of bands, 'm' denotes the number of feedback bands among all of the bands, and 'C' denotes a cost function.

Figure 5A:
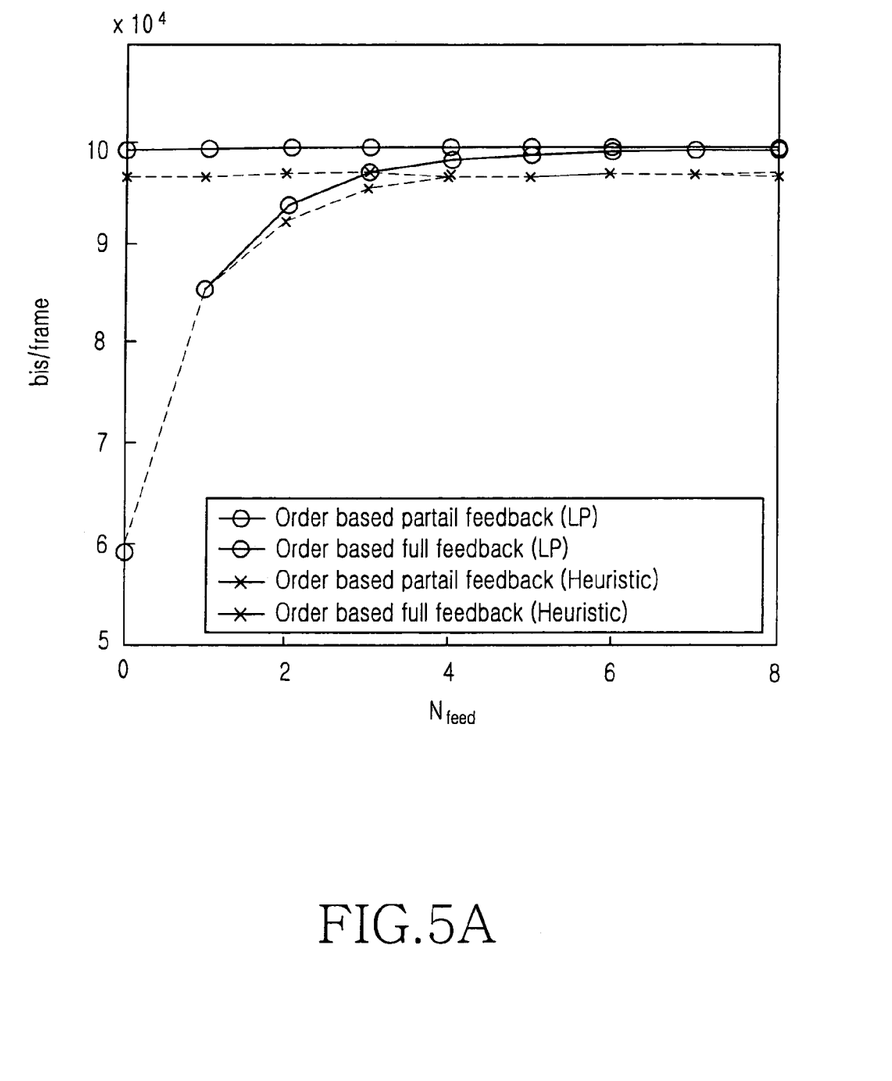
FIGS. 5A and 5B are graphs illustrating a unit data rate relationship caused by partial feedback according to an embodiment of the present invention.
Figure 5B:
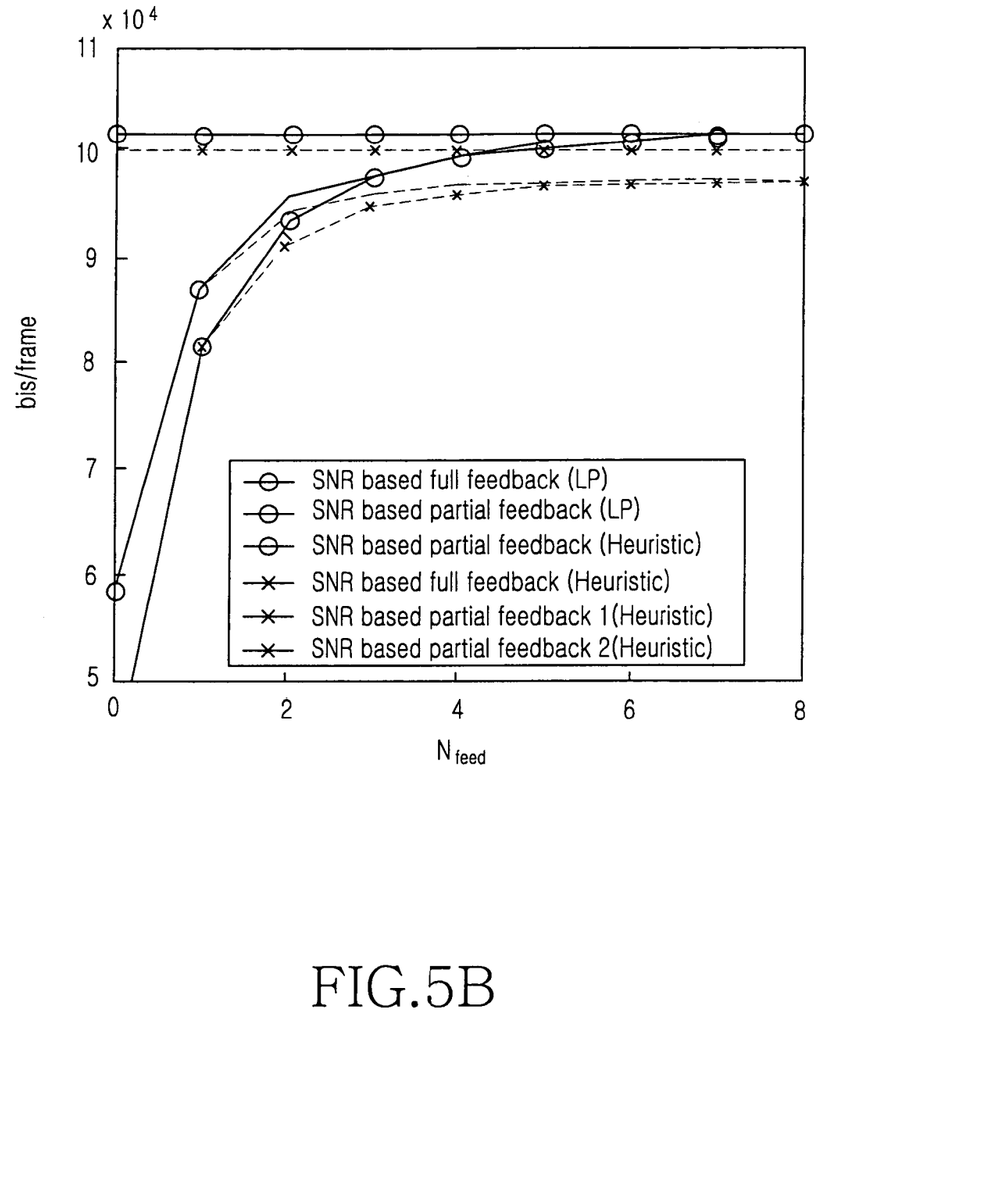

FIGS. 5A and 5B are graphs illustrating a unit data rate relationship caused by partial feedback according to an embodiment of the present invention. Specifically, FIG. 5A is a graph illustrating a data rate relationship in a TDD environment, and FIG. 5B is a graph illustrating a data rate relationship in an FDD environment.

It is assumed in FIGS. 5A and 5B that a target bit error rate (BER) is Target_BER=$10^{-2}$, the total number of bands is $N_{block}$=K=32, the number of fast Fourier transform processes (FFTs) is $N_{fft}$=1024, a frequency band is 5 GHz, and the number of transmission bits is one of 2, 4, 6 and 8. In addition, it is assumed that an average SNR is 15 dB, a velocity of a mobile station is 4 Km/h, and the number of OFDM symbols per frame for AMC is 20 in the TDD/FDD environment. As shown in FIG. 4, it can be understood from FIGS. 5A and 5B that the novel method using the partial CQI band feedback is probably equal to the method using the full band feedback in terms of a data rate. That is, the proposed method exhibits similar performance to that of the method using the full band feedback.

Figure 6A:
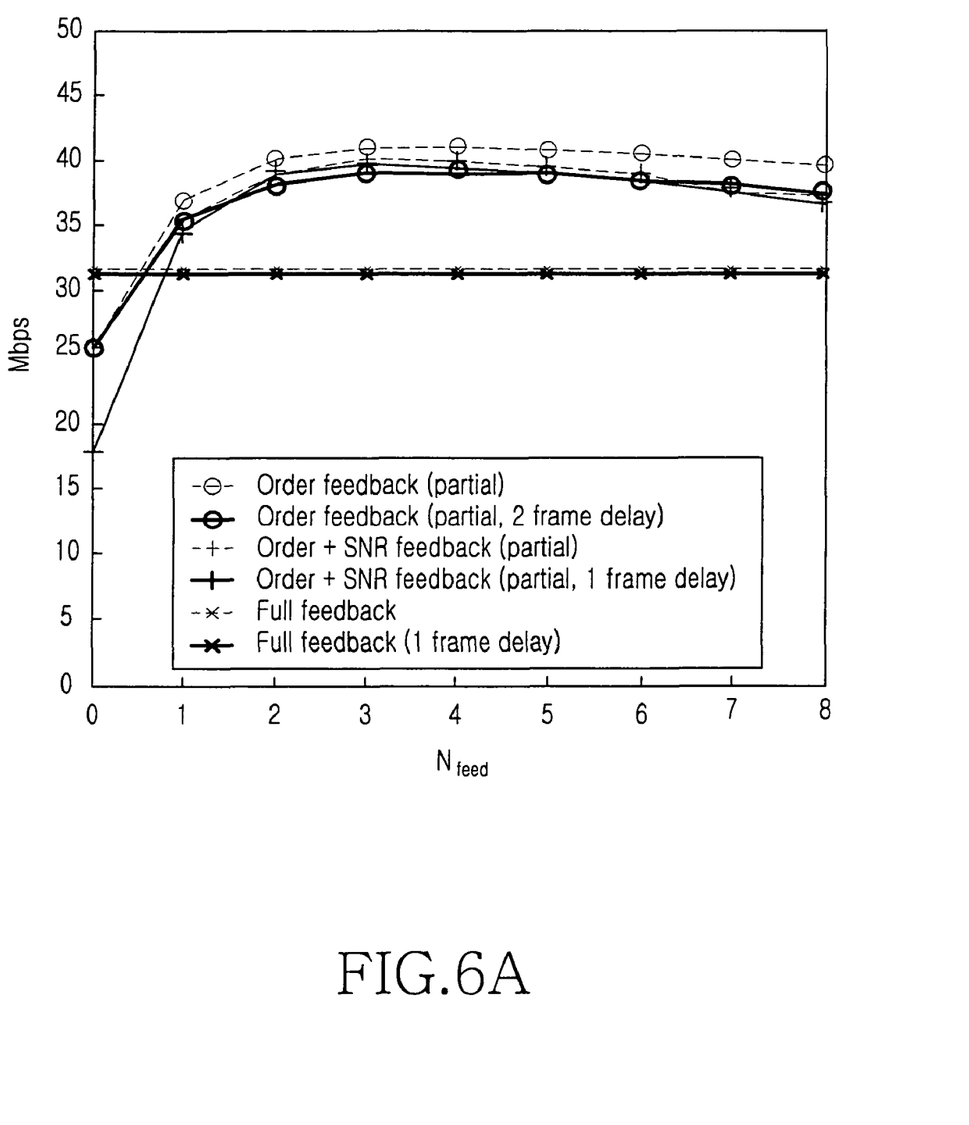
FIGS. 6A and 6B are graphs illustrating a comparison between effective data rates determined by taking the amount of feedback information into account.
Figure 6B:
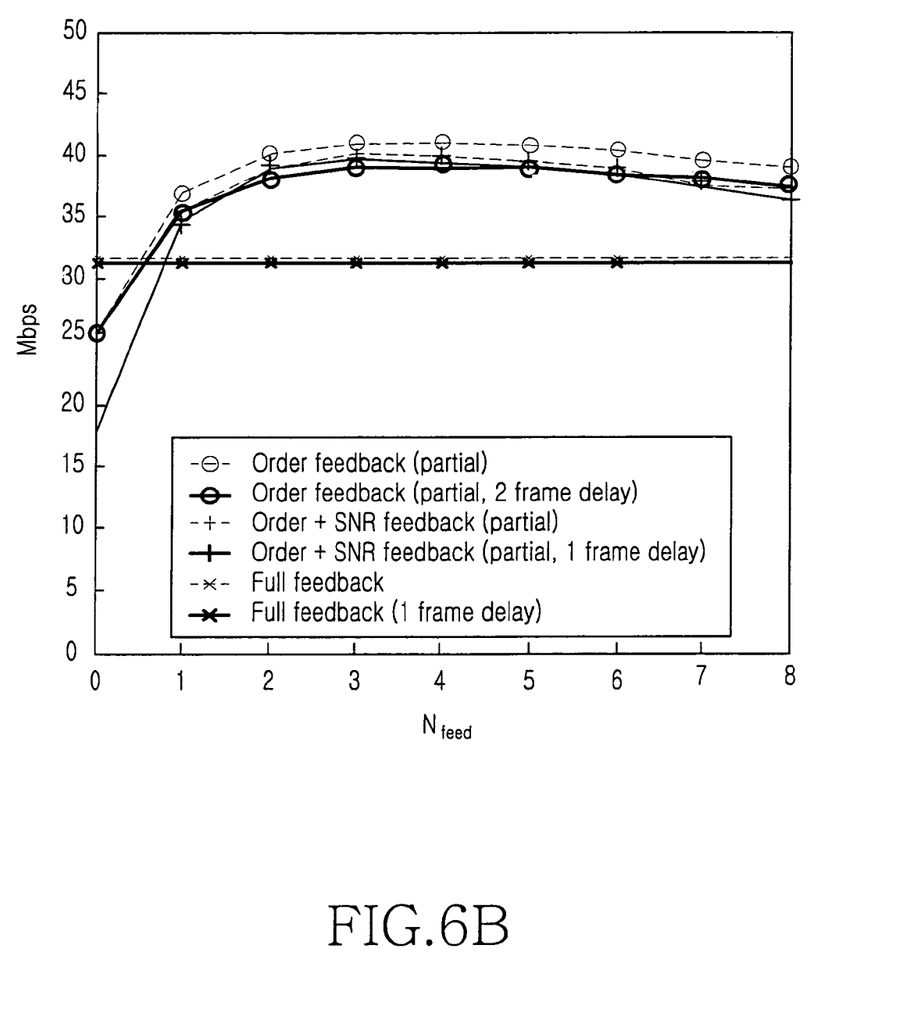

With reference to FIGS. 6A and 6B, a description will now be made of an effective data rate determined by taking the amount of feedback information into account.

FIGS. 6A and 6B are graphs illustrating a comparison between effective data rates determined by taking the amount of feedback information into account. Specifically, FIG. 6A is a graph illustrating an example for the case where a linear programming (LP) method is applied to the present invention, and FIG. 6B is a graph illustrating an example for the case where a Heuristic method is applied the present invention.

Before a description of the examples is given, for a comparison of the amount of feedback information, assuming that a coding rate of 1/4, 4-bit feedback information for SNR feedback, QPSK transmission, 32 users, or mobile stations, and 32 blocks are provided, the following are presented:

1) Full feedback
32 blocks×4 bits×1/4-coding rate×32 users=256 samples/user=8 OFDM symbols 2) Order+SNR feedback
m blocks×(5 bits+4 bits)×1/4-coding rate×32 users=18 m samples/user=567 m/1024 OFDM symbols 3) Order feedback
m blocks×5 bits×1/4-coding rate×32 users=10 m samples/user=320 m/1024 OFDM symbols The saved OFDM symbols can be additionally allocated for downlink AMC transmission.

As illustrated in FIGS. 6A and 6B, the proposed method invests feedback resources in data transmission, thereby increasing the data rate.

Feedback delay in the foregoing examples will be described below.

Full feedback or Order+decision criterion feedback→1 frame
Order-only feedback→2 frames As described above, the proposed feedback information decision method and a subchannel/bit allocation method using the same is probably equal to the method of transmitting information on all of the channels using a small amount of feedback information in an OFDMA communication system. That is, the present invention improves an actual data rate through minimization of feedback information and thus can achieve the same transmission efficiency as that in the case where the entire channel information is used with the less amount of feedback information, thereby increasing actual transmission efficiency.

As can be understood from the foregoing description, the adaptive subchannel and bit allocation method using partial channel information feedback can reduce the amount of feedback information in an OFDMA communication system, and can achieve similar transmission efficiency to that in the case where information on all of the channels are used with the less amount of feedback information. That is, the partial CQI feedback can acquire a similar unit data rate to that of the full CQI feedback.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An adaptive subchannel and bit allocation method in a wireless communication system, the method comprising:
analyzing, by a mobile station, channel quality information of a subchannel at a predetermined period and determining feedback band indexes with a predetermined maximum decision criterion based on the channel quality information from among all feedback band indexes for all of a plurality of subcarrier bands, the mobile station being located in a boundary between base stations constituting the wireless communication system, wherein each of the subchannels is divided into a diversity subchannel for acquisition of frequency diversity gain and an adaptive modulation and coding (AMC) subchannel for high-speed, high-capacity data transmission, and wherein a number of determined feedback band indexes with the predetermined maximum criterion is less than a number of all feedback band indexes for all of the plurality of subcarrier bands;
feeding back, by the mobile station, feedback information including the determined feedback band indexes to a base station;
generating, by the base station, band allocation information using the feedback information from the mobile station, and transmitting the band allocation information to the mobile station;
transmitting, by the mobile station, a pilot for AMC using the band allocation information received from the base station; and
estimating, by the base station, a channel using the pilot transmitted from the mobile station and allocating bits to an allocated band using the band allocation information according to the channel estimation result;
wherein determining the feedback band indexes with the predetermined maximum decision criterion from among all the feedback band indexes for all of the plurality of subcarrier bands comprises determining the feedback band indexes of subcarrier bands with a best channel condition among the subchannels.

2. The adaptive subchannel and bit allocation method of claim 1, further comprising feeding back, by the mobile station, the channel quality information to the base station, wherein analyzing the channel quality information of the subchannel at the predetermined period comprises estimating a downlink channel parameter using an uplink AMC band transmission.

3. The adaptive subchannel and bit allocation method of claim 1, wherein allocating the bits to the allocated band based on the band allocation information uses a channel estimation result of a 2-frame-delayed channel.

4. The adaptive subchannel and bit allocation method of claim 1, wherein the feedback information includes channel quality information, which is determined according to rankings for subcarrier bands having a best channel condition.

5. The adaptive subchannel and bit allocation method of claim 1, wherein the predetermined maximum decision criterion includes at least one of a signal-to-noise ratio (SNR), a capacity, and a number of transmittable bits.

6. The adaptive subchannel and bit allocation method of claim 1, wherein a number of feedback band indexes are determined using a broadcast channel.

7. The adaptive subchannel and bit allocation method of claim 1, wherein a number of feedback band indexes are determined using a dedicated control message.

8. The adaptive subchannel and bit allocation method of claim 1, wherein for band allocation using channel quality information feedback, an order is defined as a cost for a feedback band and sufficiently large numbers are used for costs of remaining subcarrier bands according to:

$$C = \begin{bmatrix} 1 & 8 & 8 & 2 & 8 & 8 & 3 & 8 \\ 8 & 8 & 2 & 8 & 8 & 1 & 8 & 3 \\ 8 & 2 & 8 & 1 & 8 & 3 & 8 & 8 \\ 2 & 8 & 3 & 8 & 1 & 8 & 8 & 8 \\ 8 & 1 & 8 & 2 & 8 & 8 & 3 & 8 \\ 8 & 8 & 8 & 8 & 3 & 2 & 1 & 8 \\ 2 & 3 & 8 & 8 & 8 & 8 & 8 & 1 \\ 8 & 1 & 8 & 3 & 2 & 8 & 8 & 8 \end{bmatrix},$$

where each row represents a mobile station, and each column represents the subcarrier bands, wherein the mobile station feeds back only the feedback band indexes with the predetermined maximum decision criterion and maps the remaining subcarrier bands except for subcarrier bands having the determined feedback band indexes to a maximum value.

9. An adaptive subchannel and bit allocation method in a wireless communication system, the method comprising:
   determining, by a mobile station being located in a boundary between base stations constituting the wireless communication system, feedback band indexes of subcarrier bands with a best channel condition from among all feedback band indexes for all of a plurality of subcarrier bands by using feedback band allocation information of previous channels, and feeding back feedback information including the determined feedback band indexes to a base station, wherein a number of feedback band indexes of subcarrier bands with the best channel condition is less than a number of all feedback band indexes for all of the plurality of subcarrier bands;
   transmitting, by the base station, band allocation information generated using the feedback information to the mobile station;
   transmitting, by the mobile station, a pilot for adaptive modulation and coding (AMC) to the base station using the received band allocation information from the base station; and
   estimating, by the base station, a channel using the received pilot, and allocating bits for a band, which is allocated using the band allocation information, according to a channel estimation result.

10. The adaptive subchannel and bit allocation method of claim 9, further comprising feeding back, by the mobile station, channel quality information, wherein the channel quality information is analyzed by estimating a downlink channel parameter using an uplink AMC band transmission.

11. The adaptive subchannel and bit allocation method of claim 9, wherein allocating bits for the band uses a channel estimation result of a 2-frame-delayed channel.

12. The adaptive subchannel and bit allocation method of claim 9, wherein the feedback information includes channel quality information, which is determined according to rankings for subcarrier bands having a best channel condition.

13. The adaptive subchannel and bit allocation method of claim 9, wherein a number of the feedback band indexes are determined using a broadcast channel.

14. The adaptive subchannel and bit allocation method of claim 9, wherein a number of feedback band indexes are determined using a dedicated control message.

15. The adaptive subchannel and bit allocation method of claim 9, wherein for band allocation using channel quality information feedback, an order is defined as a cost for a feedback band and sufficiently large numbers are used for costs of remaining subcarrier bands according to:

$$C = \begin{bmatrix} 1 & 8 & 8 & 2 & 8 & 8 & 3 & 8 \\ 8 & 8 & 2 & 8 & 8 & 1 & 8 & 3 \\ 8 & 2 & 8 & 1 & 8 & 3 & 8 & 8 \\ 2 & 8 & 3 & 8 & 1 & 8 & 8 & 8 \\ 8 & 1 & 8 & 2 & 8 & 8 & 3 & 8 \\ 8 & 8 & 8 & 8 & 3 & 2 & 1 & 8 \\ 2 & 3 & 8 & 8 & 8 & 8 & 8 & 1 \\ 8 & 1 & 8 & 3 & 2 & 8 & 8 & 8 \end{bmatrix},$$

where each row represents a mobile station, and each column represents the subcarrier bands, wherein the mobile station feeds back only the feedback band indexes with the predetermined maximum decision criterion and maps the remaining subcarrier bands except for subcarrier bands having the determined feedback band indexes to a maximum value.

16. An adaptive subchannel and bit allocation method in a wireless communication system, the method comprising:
   analyzing, by a mobile station, channel quality information of a subchannel at a predetermined period and determining feedback band indexes with a predetermined maximum decision criterion based on the channel quality information from among all feedback band indexes for all of a plurality of subcarrier bands, and transmitting the determined feedback band indexes and a pilot for uplink adaptive modulation and coding (AMC) to a base station, the mobile station being located in a boundary between base stations constituting the wireless communication system, wherein each of the subchannels is divided into a diversity subchannel for acquisition of frequency diversity gain and an AMC subchannel for high-speed, high-capacity data transmission, and wherein a number of determined feedback band indexes with the predetermined maximum decision criterion is less than a number of all feedback band indexes for all of the plurality of subcarrier bands; and
   estimating, by the base station, a channel using the pilot transmitted from the mobile station and allocating a downlink band and bits for the downlink band using feedback information including the feedback band indexes according to a channel estimation result and performing AMC using the allocated downlink band;
   wherein determining the feedback band indexes with the predetermined maximum decision criterion from among all the feedback band indexes for all of the plurality of subcarrier bands comprises determining the feedback band indexes of subcarrier bands with a best channel condition among the subchannels.

17. The adaptive subchannel and bit allocation method of claim 16, further comprising feeding back the channel quality information to the base station, wherein feeding back the channel quality information comprises feeding back the feedback band indexes with the predetermined maximum decision criterion and a decision criterion value.

18. The adaptive subchannel and bit allocation method of claim 17, wherein the channel quality information is fed back by taking into account rankings for subcarrier bands with a best channel condition and a modulation and coding selection (MCS) level.

19. The adaptive subchannel and bit allocation method of claim 16, further comprising feeding back the channel quality information to the base station, wherein feeding back the channel quality information comprises feeding back all channel quality information for an uplink AMC subchannel.

20. The adaptive subchannel and bit allocation method of claim 19, wherein during the feeding back, at least one pilot is transmitted per band.

21. The adaptive subchannel and bit allocation method of claim 19, wherein the channel quality information is fed back by taking into account rankings for subcarrier bands with a best channel condition and a modulation and coding selection (MCS) level.

22. The adaptive subchannel and bit allocation method of claim 16, wherein allocating the bits to the downlink band uses a channel estimation result of a 1-frame-delayed channel.

23. The adaptive subchannel and bit allocation method of claim 16, wherein when a non-feedback band is allocated, transmission of the pilot for uplink AMC is achieved at a minimum rate.

24. The adaptive subchannel and bit allocation method of claim 16, wherein for band allocation using channel quality information feedback, the predetermined maximum decision criterion is defined as a cost for a feedback band and sufficiently small numbers are used for costs of remaining subcarrier bands according to:

$$C = \begin{bmatrix} 2 & 0 & 0 & 4 & 0 & 0 & 6 & 0 \\ 0 & 0 & 2 & 0 & 0 & 4 & 0 & 6 \\ 0 & 4 & 0 & 6 & 0 & 2 & 0 & 0 \\ 2 & 0 & 3 & 0 & 1 & 0 & 0 & 0 \\ 0 & 6 & 0 & 4 & 0 & 0 & 2 & 0 \\ 0 & 0 & 0 & 0 & 2 & 4 & 6 & 0 \\ 4 & 2 & 0 & 0 & 0 & 0 & 0 & 6 \\ 0 & 6 & 0 & 2 & 4 & 0 & 0 & 0 \end{bmatrix},$$

where each row represents a mobile station, and each column represents the subcarrier bands, wherein the mobile station feeds back the feedback band indexes with the predetermined maximum decision criterion and a decision criterion indicative of a signal-to-noise ratio (SNR) and a number of transmittable bits, and maps the remaining subcarrier bands except for subcarrier bands having the determined feedback band indexes to a minimum value.

25. An adaptive subchannel and bit allocation method in a wireless communication system, the method comprising:
  determining, by a mobile station being located in a boundary between base station constituting the wireless communication system, a feedback band index with a predetermined maximum decision criterion by using feedback band allocation information of a previous channel, and feeding back feedback information including the determined feedback band index to a base station;
  transmitting, by the base station, band allocation information generated using the feedback information to the mobile station;
  determining, by the mobile station, feedback band indexes of subcarrier bands with a next maximum decision criterion, except for the feedback band index with the predetermined maximum decision criterion, and feeding back the determined feedback band indexes and a decision criterion value, wherein a number of feedback band indexes of subcarrier bands with the next maximum decision criterion is less than a number of all feedback band indexes for all of a plurality of subcarrier bands; and
  allocating, by the base station, a downlink band and bits for the downlink band using feedback information including the feedback band indexes and performing AMC using the allocated downlink band;
  wherein the feedback band index with the predetermined maximum decision criterion is a feedback band index of a subcarrier band with a best channel condition among the subchannels.

26. The adaptive subchannel and bit allocation method of claim 25, further comprising feeding back channel quality information to the base station, wherein feeding back the channel quality information comprises feeding back the feedback band indexes with a best channel condition and the decision criterion value.

27. The adaptive subchannel and bit allocation method of claim 26, wherein during the feeding back, at least one pilot is transmitted per band.

28. The adaptive subchannel and bit allocation method of claim 26, wherein the channel quality information is fed back by taking into account rankings for subcarrier bands with the best channel condition and a modulation and coding selection (MCS) level.

29. The adaptive subchannel and bit allocation method of claim 25, wherein allocating the bits to the downlink band uses a channel estimation result of a 1-frame-delayed channel.

30. The adaptive subchannel and bit allocation method of claim 25, wherein for band allocation using channel quality information feedback, the predetermined maximum decision criterion is defined as a cost for a feedback band and sufficiently small numbers are used for costs of remaining subcarrier bands according to:

$$C = \begin{bmatrix} 2 & 0 & 0 & 4 & 0 & 0 & 6 & 0 \\ 0 & 0 & 2 & 0 & 0 & 4 & 0 & 6 \\ 0 & 4 & 0 & 6 & 0 & 2 & 0 & 0 \\ 2 & 0 & 3 & 0 & 1 & 0 & 0 & 0 \\ 0 & 6 & 0 & 4 & 0 & 0 & 2 & 0 \\ 0 & 0 & 0 & 0 & 2 & 4 & 6 & 0 \\ 4 & 2 & 0 & 0 & 0 & 0 & 0 & 6 \\ 0 & 6 & 0 & 2 & 4 & 0 & 0 & 0 \end{bmatrix},$$

where each row represents a mobile station, and each column represents the subcarrier bands, wherein the mobile station feeds back the feedback band indexes with the predetermined maximum decision criterion, a decision criterion indicative of a signal-to-noise ratio (SNR) and a number of transmittable bits, and maps the remaining subcarrier bands except for subcarrier bands having the determined feedback band indexes to a minimum value.

* * * * *